(12) United States Patent
Clarkson

(10) Patent No.: US 6,361,387 B1
(45) Date of Patent: Mar. 26, 2002

(54) MARINE PROPULSION APPARATUS WITH DUAL DRIVESHAFTS EXTENDING FROM A FORWARD END OF AN ENGINE

(75) Inventor: Daniel E. Clarkson, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/766,388

(22) Filed: Jan. 19, 2001

(51) Int. Cl.[7] .............................................. B63H 23/34
(52) U.S. Cl. .............................. 440/83; 440/75; 114/151
(58) Field of Search ............................ 114/151; 440/53, 440/57, 75, 83

(56) References Cited

U.S. PATENT DOCUMENTS

| | | | |
|---|---|---|---|
| 1,883,661 A | | 10/1932 | Fernstrum |
| 3,207,118 A | | 9/1965 | Baldwin |
| 3,289,628 A | * | 12/1966 | Sable ........................... 440/75 |
| 3,487,805 A | * | 1/1970 | Satterthwaite et al. ...... 114/151 |
| 4,383,829 A | * | 5/1983 | Allen, Jr. et al. ............. 440/75 |
| 5,711,742 A | * | 1/1998 | Leinonen et al. ............. 440/75 |
| 6,066,012 A | * | 5/2000 | Nagle ........................... 440/75 |
| 6,132,269 A | * | 10/2000 | Belt ............................... 440/38 |
| 6,142,841 A | * | 11/2000 | Alexander et al. ............ 440/38 |
| 6,234,853 B1 | * | 5/2001 | Lanyi .......................... 440/53 |

OTHER PUBLICATIONS

"Smallcraft Propulsion" by robert W. Hobbs, Popular Boating Magazine, 1962.

* cited by examiner

*Primary Examiner*—Stephen Avila
(74) *Attorney, Agent, or Firm*—William D. Lanyi

(57) ABSTRACT

A marine propulsion system provides dual driveshafts which are connected in torque transmitting relation with associated propellers. In addition, a bow thruster is provided to provide a thrust on the bow of the marine vessel in the port and starboard directions. An output shaft extends from an engine in a forward direction, toward the bow, and two driveshafts extend from torque transmitting devices, which are also disposed forward from the engine, wherein the driveshafts extend in a rearward direction toward the transom. The driveshafts can be associated directly with propellers, in applications where the driveshafts extend through the transom or through a bottom portion of the hull. Alternatively, the driveshafts can be associated with stern drive units. Efficient maneuvering can be accomplished by selectably determining the magnitudes and directions of the three thrust vectors provided by the two propellers and the bow thruster.

14 Claims, 7 Drawing Sheets

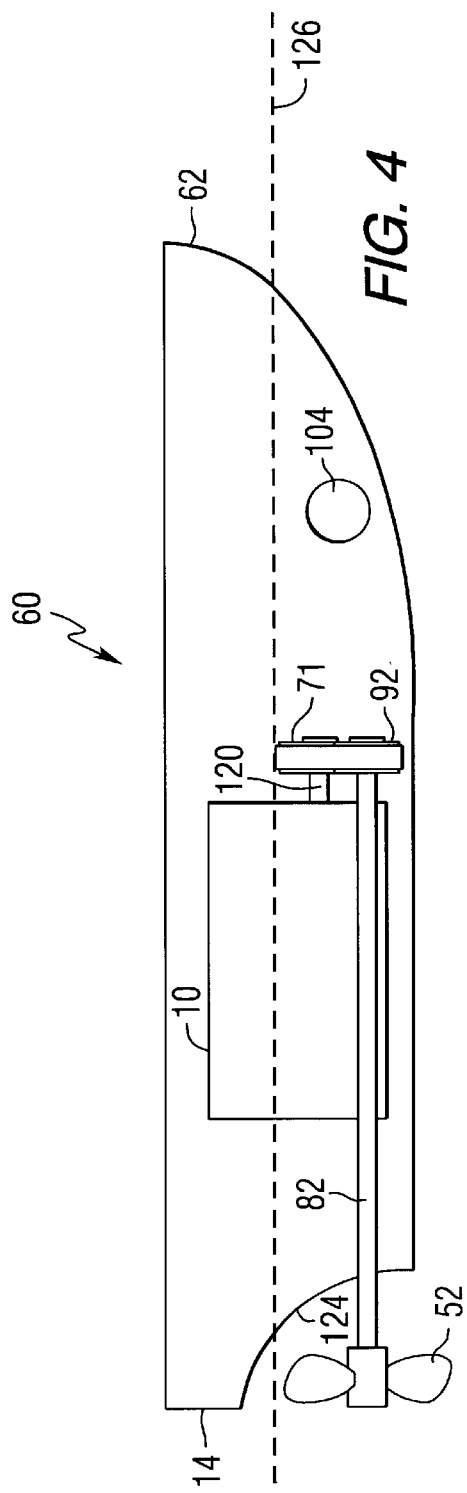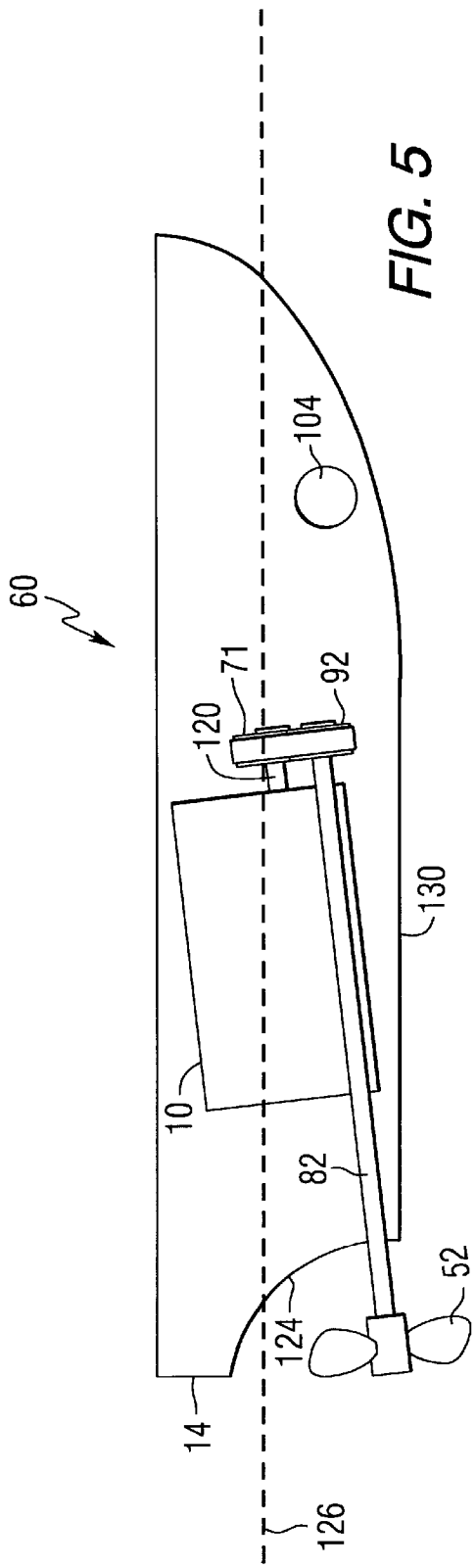

MARINE PROPULSION APPARATUS WITH DUAL DRIVESHAFTS EXTENDING FROM A FORWARD END OF AN ENGINE

BACKGROUND OF THE INVENTION

1. Field of the Invention

The present invention is generally related to a marine propulsion apparatus and, more particularly, to a marine propulsion apparatus that employs an engine with an output shaft extending in a forward direction, the output shaft being coupled, in torque transmitting relation, with a pair of driveshafts that extend in an aft direction and which are attached in torque transmitting relation with individual propellers.

2. Description of the Prior Art

Many different types of marine propulsion systems are known to those skilled in the art. These systems are typically classified as inboard drives, outboard motors, or stern drive systems, but many other arrangement are also known to those skilled in the art. In an article titled "Smallcraft Propulsion" by Robert W. Hobbs, which appeared in Popular Boating Magazine in 1962, the author describes twenty-five different arrangements of marine propulsion systems. In some systems, described in the Hobbs article, the engine is arranged with an output shaft extending in an aft direction, towards the transom of a marine vessel. In other applications, the engine is arranged with its output shaft extending in a forward direction, toward the bow of the marine vessel. Some of the systems employ the propeller arranged in a conventional arrangement, in which the propeller provides a thrust that "pushes" the marine vessel forward while other arrangements employ a propeller in a "tractor" arrangement.

U.S. Pat. No. 3,207,118, which issued to Baldwin on Sep. 21, 1965, describes improvements in boat propulsion systems. It specifically provides a propulsion system where the steering ability is made easier and more effective. The propellers are positioned so that the force of the water backward under the boat has a stabilizing influence on the boat, materially lessening the rolling and pitching of the boat even in high seas.

U.S. Pat. No. 1,883,661, which issued to Fernstrum on Oct. 18, 1932, describes a marine motor which provides for the mounting of both its flywheel and accessory shaft drive at the forward end of the engine. The V-belt drive is accommodated to the usual forward mounting of the flywheel in marine practice. Moreover, particular ease in changing the V-belt is enabled by mounting the belt at the forward face of the flywheel so that a new belt need not be positioned behind a rotating member.

U.S. Pat. No. 6,142,841, which was issued to Alexander et al on Nov. 7, 2000, describes a water jet docking control system for a marine vessel. The maneuvering control system utilizes pressurized liquid at three or more positions of a marine vessel in order to selectively create thrust that moves the vessel into desired locations and according to chosen movements. The outlook conduits are mounted to the hull of the vessel and direct streams of liquid away from the vessel for purposes of creating thrusts which move the vessel as desired. Electrical embodiments of the device can utilize one or more pairs of impellers to cause fluid to flow through outlet conduits in order to provide thrust on the marine vessel.

U.S. Pat. No. 6,234,853, which was issued on May 22, 2000, by Lanyi et al discloses a simplified docking method and apparatus for a multiple engine marine vessel. The docking system utilizes the marine propulsion unit of a marine vessel, under the control of an engine control unit that receives command signals from a joystick or push button device, to respond to a maneuver command from the marine operator. The docking system does not require additional propulsion devices other than those normally used to operate the marine vessel under normal conditions. The docking system uses two marine propulsion units to respond to an operator's command signal and allows the operator to select forward or reverse commands in combination with clockwise or counterclockwise rotational commands, either in combination with each other or alone.

The patents described above are hereby expressly incorporated by reference in the following description of the present invention.

In the prior art, it is known that a pair of propulsion devices, such as two outboard motors or two stern drive systems, can be used in combination with each other to maneuver a marine vessel in response to commands received from the operator of the vessel. It is also known that bow thrusters, which provide a force on the marine vessel that is perpendicular to the vessel's centerline which extends from bow to stern, can be used to assist in maneuvering and docking operations. Although various devices are known in the prior art to accomplish the goal of maneuvering a marine vessel, known devices also have certain disadvantages. For example, in marine propulsion systems that utilize an internal combustion engine supported within the hull of the vessel, the use of various types of transmissions between the engine and the propeller shafts requires that the internal combustion engine be spaced apart from the transom by a sufficient distance to allow the transmission or other devices to be located within the marine vessel, in front of the transom and behind the engine. This requires that the engine be moved forward within the hull of the marine vessel and this can lead to certain disadvantage locations of the center of gravity of the vessel and, in addition, can reduce the allowed space available for other purposes within the hull structure of the marine vessel.

SUMMARY OF THE INVENTION

A marine propulsion apparatus made in accordance with the present invention comprises an engine that is disposable in a marine vessel. An output shaft of the engine extends from the engine in a forward direction away from a transom of the marine vessel. First and second torque transmitting devices, such as pulleys, are attached in torque transmitting relation with the output shaft of the engine and located forward of the engine. A first driveshaft is connected in torque transmitting relation with the first torque transmitting device and extends in an aft direction from the first torque transmitting device at the front part of the engine. A second driveshaft is connected in torque transmitting relation with the second torque transmitting device at the front of the engine and the second driveshaft extends in an aft direction from the second torque transmitting device.

A particularly preferred embodiment of the present invention further comprises a bow thruster for exerting a thrust vector in a direction that is generally perpendicular to a central axis extending from a bow of the marine vessel to a stern of the marine vessel. The first torque transmitting device can be a first pulley connected in torque transmitting relation with the output shaft and the second torque transmitting device can be a second pulley connected in torque transmitting relation with the output shaft.

The present invention can further comprise a first driveshaft pulley attached to the first driveshaft and a second driveshaft pulley attached to the second driveshaft. The first and second driveshafts can extend through the transom of the marine vessel in one embodiment of the present invention. In alternative embodiments, the first and second driveshafts can extend through the bottom of the marine vessel or, alternatively, through the transom and in torque transmitting relation with two stern drive units.

In one embodiment of the present invention, it further comprises a first stern drive apparatus and a second stern drive apparatus attached to the transom of the marine vessel and a propeller supported for rotation by each of the first and second stern drive apparatus, whereby each propeller is connected in torque transmitting relation with its associated driveshaft. Alternatively, the first and second propellers can be attached directly to the first and second driveshafts.

BRIEF DESCRIPTION OF THE DRAWINGS

The present invention will be more fully and clearly understood from a reading of the description of the preferred embodiment, in conjunction with the drawings, in which:

FIGS. 4, 5, and 6 show three configurations employing the present invention in a marine vessel.

DESCRIPTION OF THE PREFERRED EMBODIMENT

Figure 1:
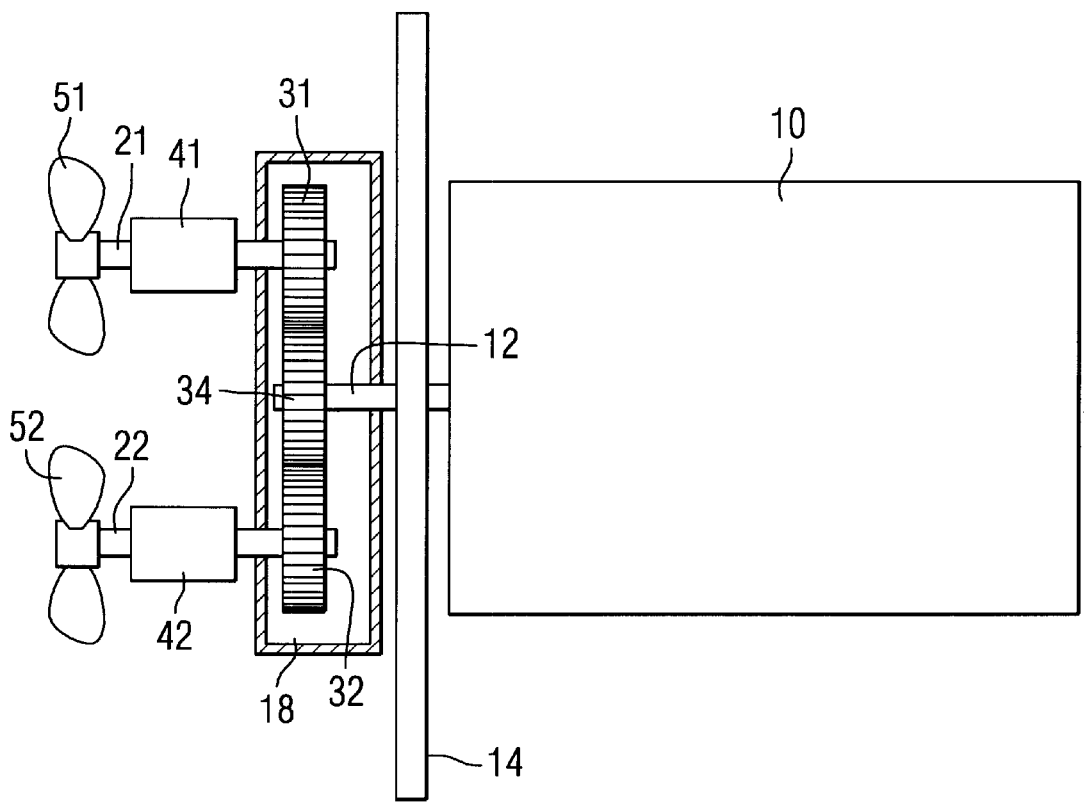
FIG. 1 shows a prior art configuration with dual propellers.

Throughout the description of the preferred embodiment of the present invention, like components will be identified by like reference numerals.

In the article described above, titled "Smallcraft Propulsion" and authored by Robert W. Hobbs, numerous marine propulsion systems are described. One particular propulsion system is referred to as the "Y" drive and is identified as propulsion system number 4 in the article. FIG. 1 is a highly schematic representation of that type of marine propulsion system. An engine 10 has an output shaft 12 which extends through a transom 14 of a marine vessel. A gear box 18, which is sometimes referred to as a "splitter box", distributes the torque provided by the output shaft 12 to a first propeller shaft 21 and a second propeller shaft 22 through a combination of gears in which a first gear 31 is associated with the first propeller shaft 21 and a second gear 32 is associated with the second propeller shaft 22. A drive gear 34 is attached to the output shaft 12 of the engine 10. A system of this type can also be provided with a first clutch 41 and a second clutch 42 which enable the operator of the marine vessel to selectively disconnect either the first propeller 51 or the second propeller 52 from torque transmitting relation with its associated gear, 31 or 32, respectively. It should be understood that FIG. 1 is not intended to describe the "Y" drive in detail but, instead, is intended to provide a description of the basic structure of the device and also describe the relative position of the engine 10, the propeller shafts, 21 and 22, and the output shaft 12.

Figure 2:
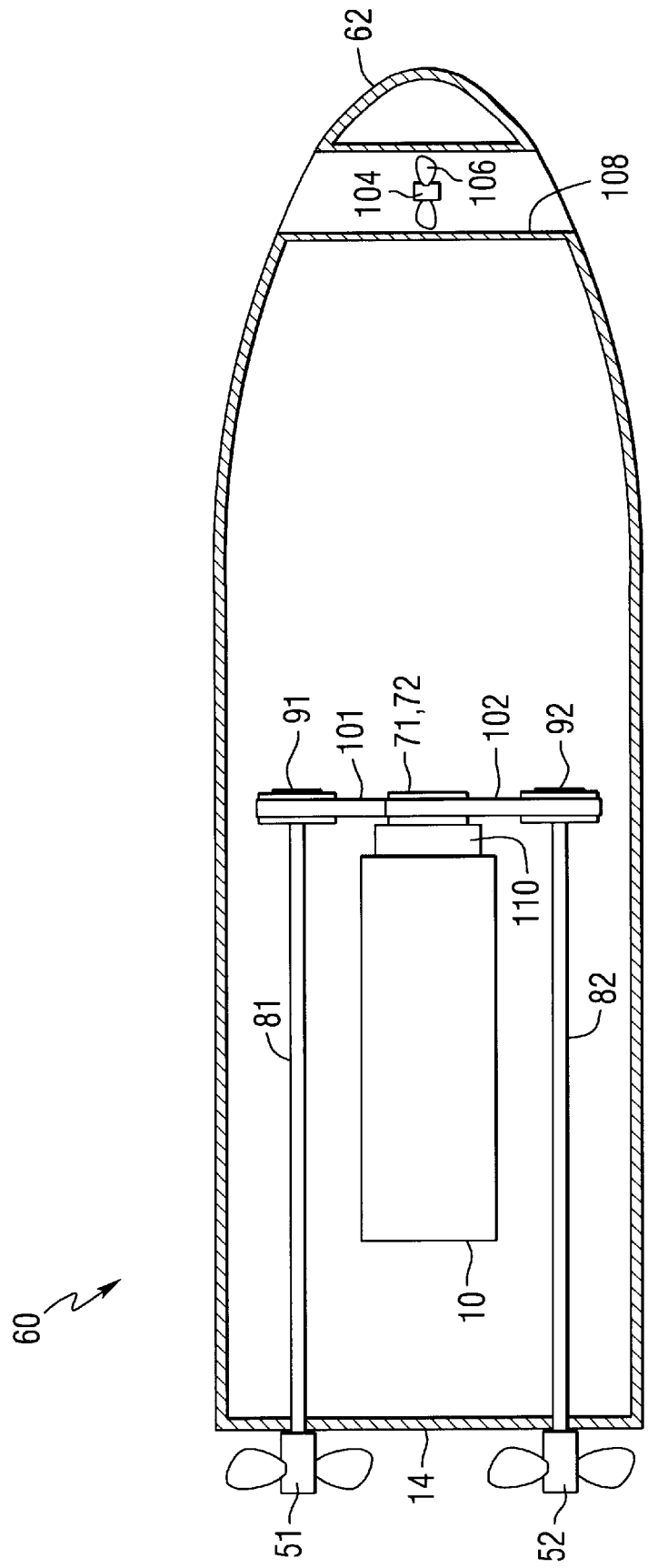
FIG. 2 is a schematic representation of the present invention.

FIG. 2 is a schematic representation of a marine vessel 60 made in accordance with the concepts of the present invention. The marine vessel is provided with an engine 10 that has an output shaft extending in a forward direction toward the bow 62 of the marine vessel 60. Although the output shaft is not specifically shown in FIG. 2, it should be understood that the output shaft extends from the engine to first and second torque transmitting devices, 71 and 72, which are aligned in the embodiment shown in FIG. 2. In other words, the second torque transmitting device 72 is located above the first torque transmitting device 71 in the view of FIG. 2. A first driveshaft 81 is connected in torque transmitting relation with the first torque transmitting device 71 and the first driveshaft 81 extends in an aft direction, toward the transom 14, from the first torque transmitting device 71. A second driveshaft 82 is connected in torque transmitting relation with the second torque transmitting device 72 and the second driveshaft 82 extends toward the transom 14 in an aft direction from the second torque transmitting device 72. In the embodiment shown in FIG. 2, a first driveshaft pulley 91 is attached to the first driveshaft 81 and a second driveshaft pulley 92 is attached to the second driveshaft 82. A first pulley belt 101 connects the first driveshaft pulley 91 in torque transmitting relation with the first torque transmitting device 71 and a second pulley belt 102 connects the second driveshaft pulley 92 in torque transmitting relation with the second torque transmitting device 72.

As can be seen in FIG. 2, the output shaft of the engine 10 extends in a forward direction toward the bow 62 of the vessel 60 while both the first and second driveshaft, 81 and 82, extend in an aft direction toward the transom 14. A bow thruster 104 is provided in a preferred embodiment of the present invention and it comprises an impeller 106 disposed in a tunnel 108 at the bow 62 of the vessel 60. Bow thrusters are well known to those skilled in the art and can provide thrust in either the port or starboard directions, depending on the direction of rotation of the impeller 106. Bow thrusters provide a thrust vector to move the bow 62 of the marine vessel 60 in a desired direction, particularly during maneuvering of the marine vessel.

Also shown in FIG. 2 is a transmission device 110 associated with the output shaft of the engine 10. Although not necessary on all embodiments of the present invention, the transmission device 110 allows the marine vessel operator to change the relative speeds of the first and second torque transmitting devices, 71 and 72, during maneuvering procedures. The transmission device 110 can change the gearing between the output shaft of the engine and the first and second torque transmitting devices, 71 and 72. Alternatively, the first and second torque transmitting devices, 71 and 72, can utilize pulleys which can comprise variable sheaves so that the relative speeds of the pulley belts, 101 and 102, can be changed to affect the relative rotational speeds of the two driveshafts, 81 and 82.

With continued reference to FIG. 2, first and second propellers, 51 and 52, are attached to the driveshafts, 81 and 82, respectively.

Although FIG. 2 is drawn schematically and not to scale, it can be understood that the location of the torque transmitting devices, 71 and 72, and the transmission device 110 at the front portion of the engine 10 allows the engine 10 to be located at a position closer to the transom 14 than would be otherwise be possible if these torque transmitting devices were located at the rear portion of the engine 10, between the engine 10 and the transom 14. The ability to locate the engine 10 at a position more rearward than would otherwise be possible allows the designer of a marine vessel to more effectively take advantage of space within the marine vessel and, most importantly, improve the design of the marine vessel with regard to stability and efficient operation.

Figure 3:
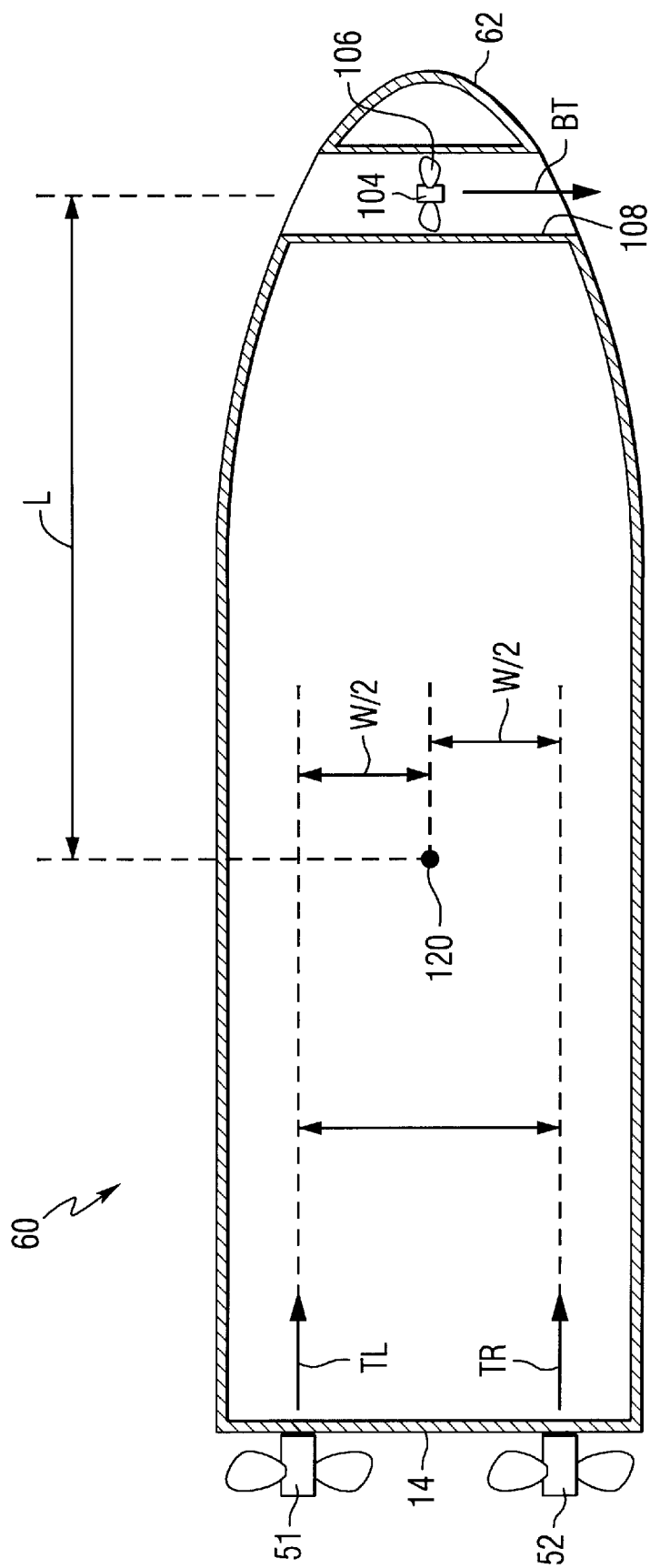
FIG. 3 is a schematic vector representation showing the thrust provided by two propellers and a bow thruster.

In order to more clearly describe the advantages of the present invention, FIG. 3 shows the marine vessel 60 with arrows representing the thrust vectors provided by the first and second propellers, 51 and 52, and the bow thruster 104. The thrust provided by the left propeller 51 is represented by arrow TL and the thrust provided by the right propeller 52 is represented by arrow TR. It should be understood that both of these thrust vectors, TL and TR, can be positive or negative, depending on the direction of rotation of the associated propeller. With regard to the bow thruster 104, it can provide a thrust in either direction. Arrow BT represents a thrust toward the right, but it should be understood that this thrust BT can be negative, which would indicate a thrust to the left on the bow 62. Reference numeral 120 identifies the effective center of rotation of the marine vessel 60. It should be understood that the effective center of rotation 120 is dependent on the speed of the marine vessel, the structure of the hull in combination with the distribution of weight within the marine vessel 60. With respect to FIG. 3, forward and reverse thrust can only be provided by the two propellers, 51 and 52, which are driven by the two driveshafts, 81 and 82, described above in conjunction with FIG. 2. Port and starboard thrusts, or left and right thrusts, can only be provided by the bow thruster 104 and its impeller 106 which rotates in the tunnel 108. However, taken in combination, the two propellers and the bow thruster can provide a wide range of movement that enables a marine vessel operator to conveniently and easily control the marine vessel 60 during docking procedures.

It can be seen that the use of the bow thruster 104, by itself, will create a moment about the center of rotation 120 and would therefore not be efficient to achieve a purely starboard movement of the marine vessel 60. In other words, with reference to FIG. 3, movement of the marine vessel 60 in a starboard direction (downward in FIG. 3) without any rotation about the center of rotation 120 is not practically possible by using only the bow thruster 104. However, in combination with the two propellers, 51 and 52, this maneuver can be accomplished. As shown below in equation 1, the marine vessel can be moved without rotation about the center of rotation 120 if the relationship in equation 1 is maintained. In other words, if the moment about the center of rotation 120 caused by the propellers, 51 and 52, balances the moment in the opposite direction about the center of rotation 120 caused by the bow thruster 104, the marine vessel 60 can be caused to sidle in a purely starboard direction. This relationship is restated in equation 2. As can be seen, the relative thrusts provided by the two propellers, 51 and 52, which are identified as TR and TL in FIG. 3, can be used to balance the moment caused by the bow thruster 104. As long as the relationship shown in equations 1 and 2 is maintained, the marine vessel 60 will move in a purely starboard direction.

$$BT(L)=TR(W/2)-TL(W/2) \qquad 1$$

$$BT(L)=(TR-TL)(W/2) \qquad 2$$

As represented below in equations 3 and 4, a pure rotational movement of the marine vessel 60 about the center of rotation 120 can be achieved if the thrust of the two propellers, 51 and 52, are exactly equal to each other, but in opposite directions. This eliminates forward or reverse motion of the marine vessel 60. As represented in equation 4 below, the rotational speed of the marine vessel 60 about its center of rotation 120 is a function of all three of the thrust vectors provided by the two propellers and the bow thruster. The combined moments of the two thrusts, TL and TR, provided by the two propellers is added to the thrust BT provided by the bow thruster. Naturally, the direction of rotation of the marine vessel 60 about its center of rotation 120 is determined by the magnitude and direction of the three thrust vectors.

$$TL=-TR \qquad 3$$

$$\text{ROTATIONAL SPEED}=f(TL(W/2)-TR(W/2)+BT(L)) \qquad 4$$

As described above, it can be seen that the marine vessel 60 can be moved in purely forward or reverse directions or, alternatively, can be rotated about its center of rotation 120 with no forward or reverse movement of the marine vessel 60. It should therefore be noted that any combination of these types of movements, in either direction, can be achieved by selectively determining the magnitude and direction of each of the three thrust vectors, TL, TR, and BT.

Since the algorithms necessary to achieve the various movements of the marine vessel 60, by selecting the magnitudes and directions of the various thrust devices, are well within the knowledge of those skilled in the art and, additionally, in view of the specific and detailed teaching in U.S. Pat. No. 6,234,853, which issued to Lanyi et al on May 22, 2001, and U.S. Pat. No. 6,142,841, which issued to Alexander et al on Nov. 7, 2000, these algorithms will not be described in detail herein.

FIG. 4 is a simplified schematic side view representation of a marine vessel 60 incorporating the marine propulsion device of the present invention. As can be seen, the output shaft 120 extends in a forward direction from the engine 10 and is connected in torque transmission relation with first and second torque transmitting devices, 71 and 72. In the view of FIG. 4, the first torque transmitting device 71 is visible, but the second torque transmitting device 72 is not. These torque transmitting devices can be pulleys which allow the torque to be transmitted by pulley belts or, alternatively, they can be gear arrangements or any other devices that allow torque to be transmitted from the output shaft 120 to the driveshafts. Also shown in FIG. 4 is the propeller 52 associated with the second driveshaft 82 and the bow thruster 104. As can be seen, the second driveshaft 82 is generally horizontal with respect to the marine vessel 60 and extends through the transom within a tunnel 124, or cavity, formed in the hull of the marine vessel 60. Dashed line 126 represents the water level of the body of water in which the marine vessel 60 is operated.

FIG. 5 is generally similar to FIG. 4, but the engine 10 and the driveshaft are supported at an angle that lowers the position of the propeller 52 relative to its position shown in FIG. 4. Although the representation in FIG. 5 continues to show the propeller 52 in the tunnel 124, it should be understood that the driveshaft 82 can also extend through the bottom 130 of the marine vessel 60 in a manner that is well known to those skilled in the art in relation to inboard marine drives.

Figure 6:
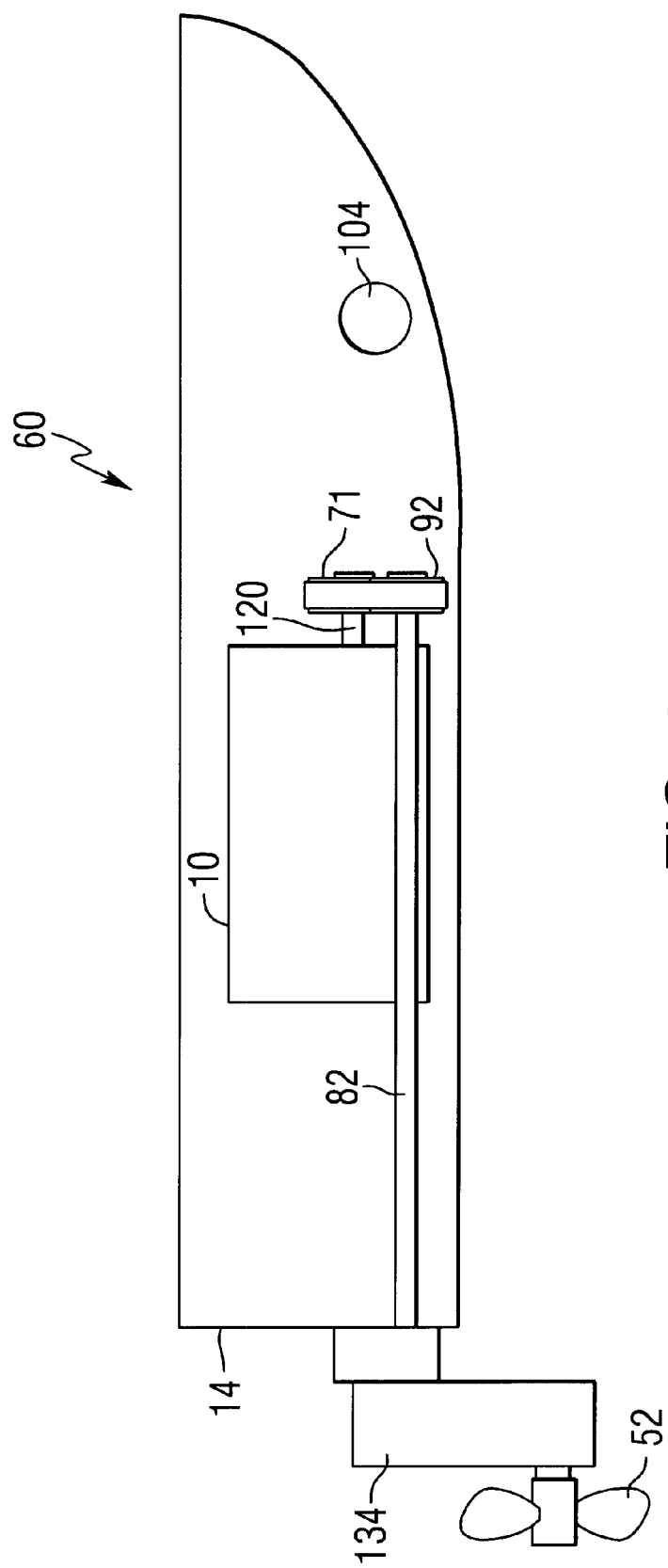

In the embodiment of the present invention shown in FIG. 6, the propeller 52 is not attached directly to the driveshaft 82. Instead, the marine vessel 60 is provided with a marine propulsion system that is generally referred to as a stern drive system by those skilled in the art. The stern drive unit 134 is attached to the transom 14 of the marine vessel 60 and, within the structure or housing of the stern drive unit 134, an arrangement of gears and shafts transmits the torque from the driveshaft 82 to a propeller shaft which is attached to the propeller 52. This structure is well known to those skilled in the art and will not be described in further detail herein. FIG. 6 illustrates that the basic concepts of the present invention are applicable for use in combination with a stern drive structure.

FIGS. 4, 5, and 6 show three applications of the present invention. In these figures, the side views only show the second driveshaft 82, the second torque transmitting device 92, and the second propeller 52. However, it should be understood that a corresponding first torque transmitting device 91, a first driveshaft 81, and a first propeller 51 are also included in the marine propulsion system, as described above in conjunction with FIGS. 2 and 3.

Figure 7:
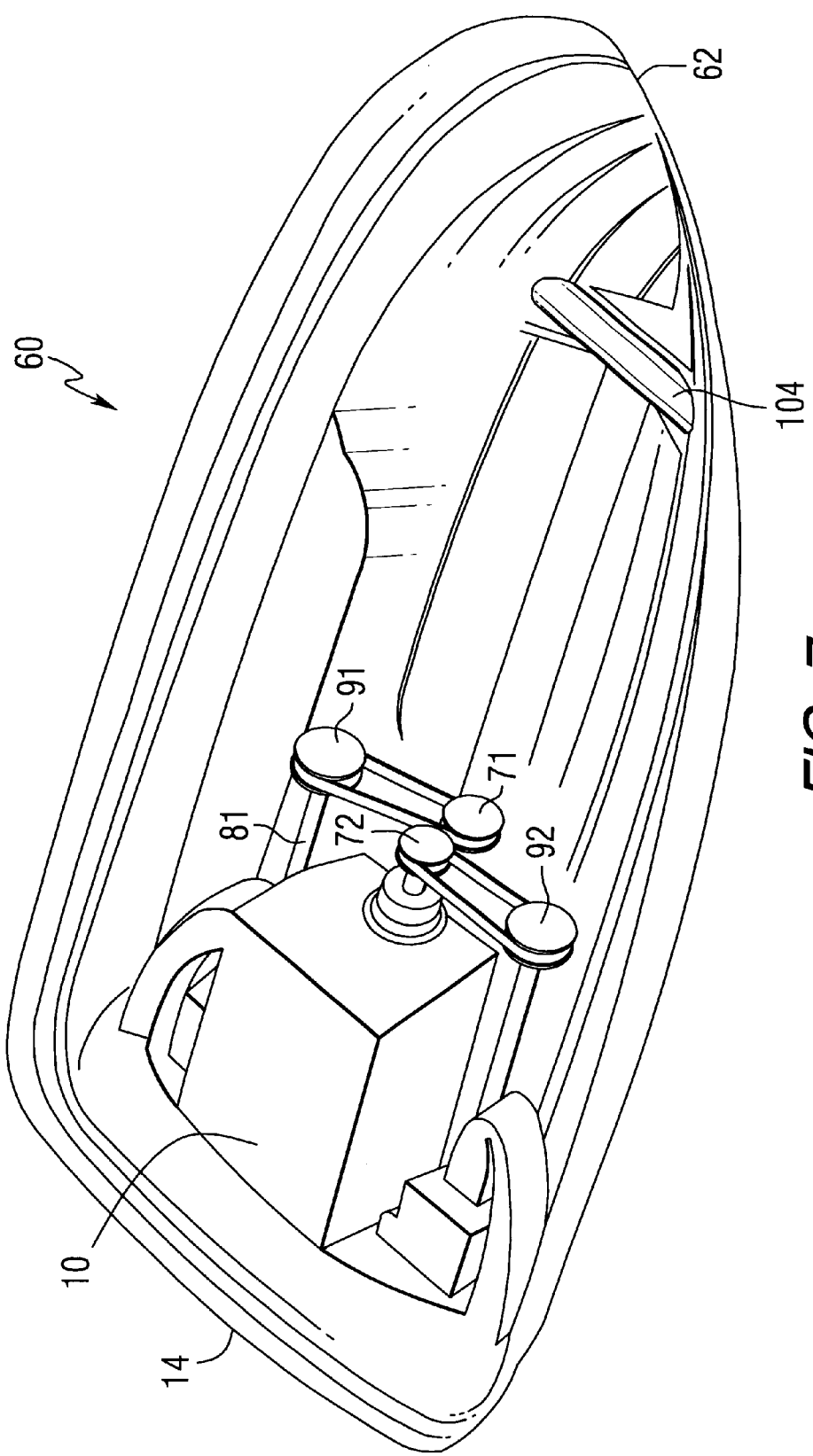
FIGS. 7 and 8 are two isometric representations of the present invention in a marine vessel.

FIG. 7 is an isometric top view of a marine vessel 60 incorporating the present invention. The hull of the marine vessel 60 is shown with an engine positioned further back toward the transom 14 than in the previous illustrations of the present invention. This is one of the advantages of the present invention. Since the first and second torque transmitting devices, 71 and 72, are positioned in front of the engine 10, the engine 10 can be moved back toward the stern. If the first and second torque transmitting devices were located behind the engine 10, the engine 10 would have to be moved to a location farther from the transom 14 and closer to the bow 62. The bow thruster 104 is also illustrated in FIG. 7. It should be understood that FIG. 7 only shows the hull and not the upper portion of the marine vessel 60.

Figure 8:
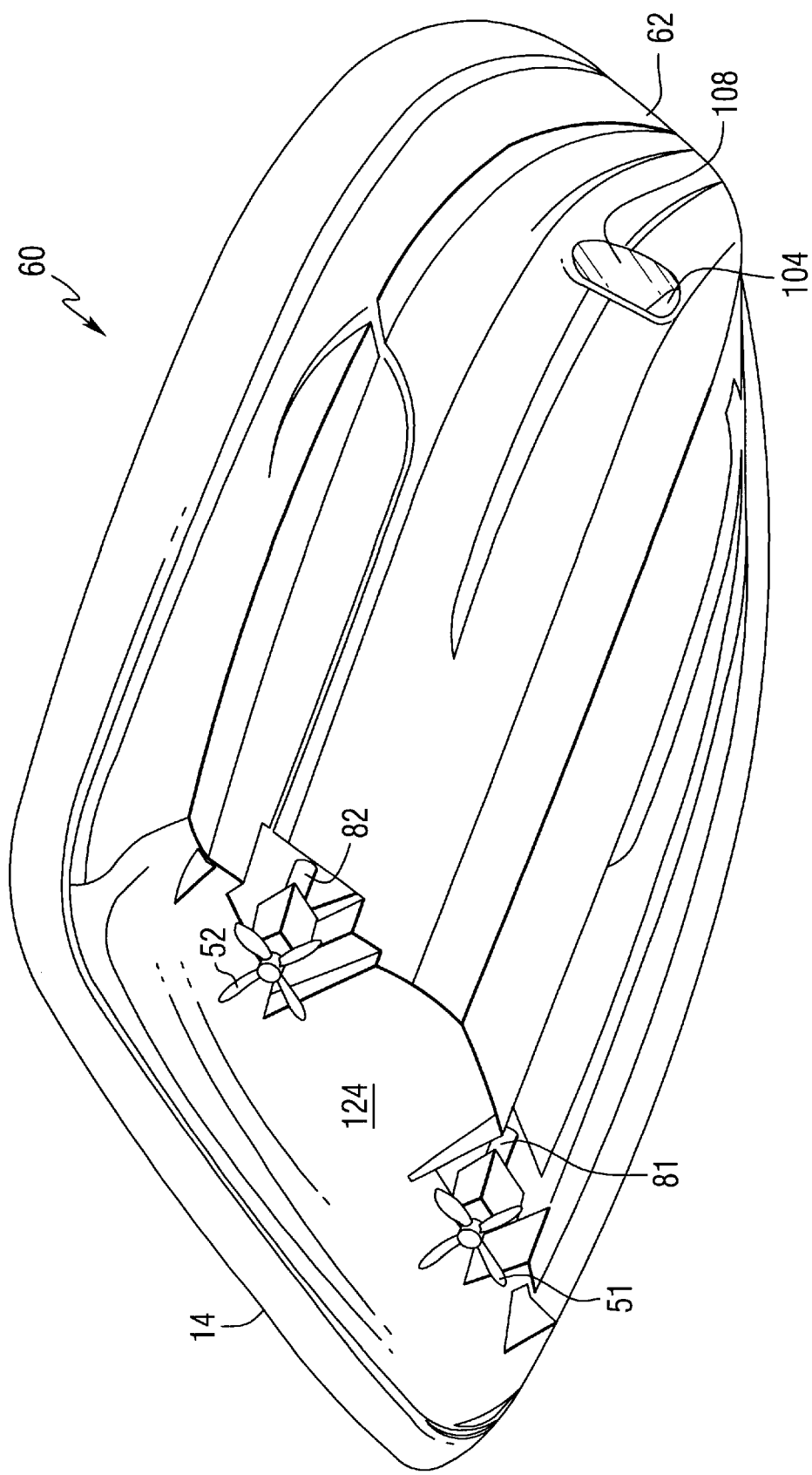

FIG. 8 is an isometric view of a marine vessel 60 incorporating the present invention. As can be seen by comparing FIGS. 7 and 8, FIG. 7 is an isometric view taken from above the marine vessel 60 and FIG. 8 is an isometric view taken from below the marine vessel 60. In FIG. 8, the propellers, 51 and 52, can be seen attached to their respective driveshafts, 81 and 82. Also, the tunnel 108 of the bow thruster 104 can be seen. The hull of the marine vessel is recessed to provide the cavity 124 in which the propellers, 51 and 52, operate.

The present invention has been described in particular detail to illustrate several embodiments. However, it should be understood that alternative embodiments are also within its scope.

I claim:

1. A marine propulsion apparatus, comprising:

an engine disposable in a marine vessel;

an output shaft of said engine extending from said engine in a forward direction away from a transom of said marine vessel;

first and second torque transmitting devices attached in torque transmitting relation with said output shaft and located forward of said engine;

a first drive shaft, said first drive shaft being connected in torque transmitting relation with said first torque transmitting device, said first drive shaft extending in an aft direction from said first torque transmitting device; and a second drive shaft, said second drive shaft being connected in torque transmitting relation with said second torque transmitting device, said second drive shaft extending in an aft direction from said second torque transmitting device, said first and second shafts being rotatable at different speeds relative to each other in response to said first and second torque transmitting devices operating at different relative speeds to each other.

2. The apparatus of claim 1, further comprising:

a bow thruster for exerting a thrust vector in a direction generally perpendicular to a central axis extending from a bow of said marine vessel to a stern of said marine vessel.

3. The apparatus of claim 1, wherein:

said first torque transmitting device is a first pulley connected in torque transmitting relation with said output shaft and said second torque transmitting device is a second pulley connected in torque transmitting relation with said output shaft.

4. The apparatus of claim 1, further comprising:

a first drive shaft pulley attached to said first drive shaft and a second drive shaft pulley attached to said second drive shaft.

5. The apparatus of claim 1, wherein:

said first and second drive shafts extend through said transom of said marine vessel.

6. The apparatus of claim 1, further comprising:

a first stern drive apparatus attached to said transom of said marine vessel;

a first propeller supported for rotation by said first stern drive apparatus and connected in torque transmitting relation with said first drive shaft;

a second stern drive apparatus attached to said transom of said marine vessel; and a second propeller supported for rotation by said second stern drive apparatus and connected in torque transmitting relation with said second drive shaft.

7. The apparatus of claim 1, further comprising:

a first propeller attached to said first drive shaft and a second propeller attached to said second drive shaft.

8. The apparatus of claim 1, further comprising:

a transmission device connected in torque transmitting relation between said output shaft of said engine and said first and second torque transmitting devices, said transmission device being configured to change said relative speeds of said first and second torque transmitting devices.

9. A marine propulsion apparatus, comprising:

an engine disposable in a marine vessel;

an output shaft of said engine extending from said engine in a forward direction away from a transom of said marine vessel;

first and second torque transmitting devices attached in torque transmitting relation with said output shaft and located forward of said engine, said first torque transmitting device is a first variable sheave pulley connected in torque transmitting relation with said output shaft and said second torque transmitting device is a second variable sheave pulley connected in torque transmitting relation with said output shaft;

a first drive shaft, said first drive shaft being connected in torque transmitting relation with said first torque transmitting device, said first drive shaft extending in an aft direction from said first torque transmitting device;

a second drive shaft, said second drive shaft being connected in torque transmitting relation with said second torque transmitting device, said second drive shaft extending in an aft direction from said second torque transmitting device; and a bow thruster for exerting a thrust vector in a direction generally perpendicular to a central axis extending from a bow of said marine vessel to a stern of said marine vessel.

10. The apparatus of claim 8, further comprising:

a first drive shaft pulley attached to said first drive shaft and a second drive shaft pulley attached to said second drive shaft.

11. The apparatus of claim 10, further comprising:

a first pulley belt connected between said first pulley and said first drive shaft pulley; and a second pulley belt connected between said second pulley and said second drive shaft pulley.

12. The apparatus of claim 11, wherein:

said first and second drive shafts extend through said transom of said marine vessel.

13. The apparatus of claim 11, further comprising:

a first stern drive apparatus attached to said transom of said marine vessel;

a first propeller supported for rotation by said first stern drive apparatus and connected in torque transmitting relation with said first drive shaft;

a second stern drive apparatus attached to said transom of said marine vessel; and a second propeller supported for rotation by said second stern drive apparatus and connected in torque transmitting relation with said second drive shaft.

14. The apparatus of claim 11, further comprising:

a first propeller attached to said first drive shaft and a second propeller attached to said second drive shaft.

* * * * *